Nov. 27, 1945.   J. HICKEY   2,389,908
PARKING INDICATOR
Filed Jan. 20, 1942   3 Sheets-Sheet 1
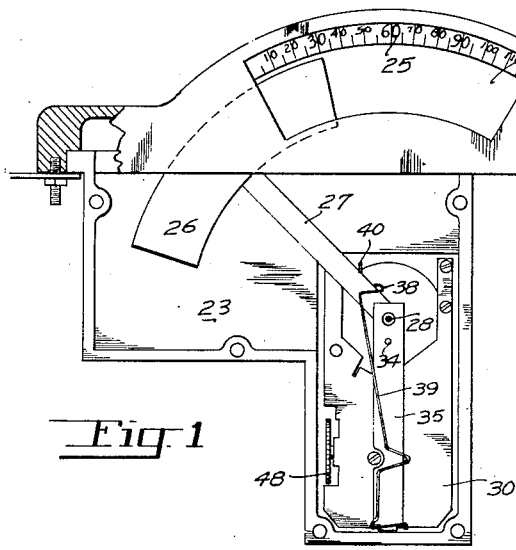
Fig. 1
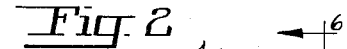
Fig. 2
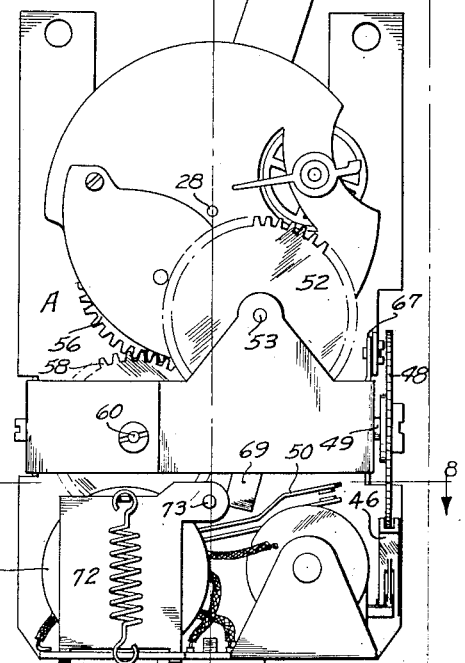
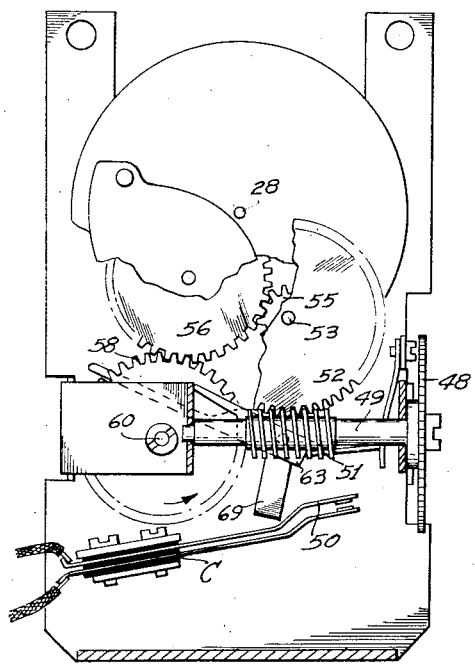
Fig. 3
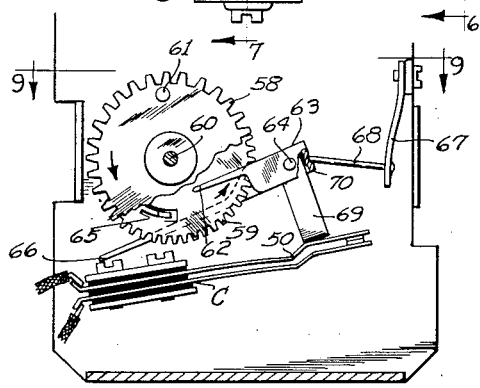
Fig. 4
JAMES HICKEY
INVENTOR.
BY T. J. Geisler and
F. R. Geisler
ATTORNEYS Nov. 27, 1945. J. HICKEY 2,389,908
PARKING INDICATOR
Filed Jan. 20, 1942 3 Sheets-Sheet 2
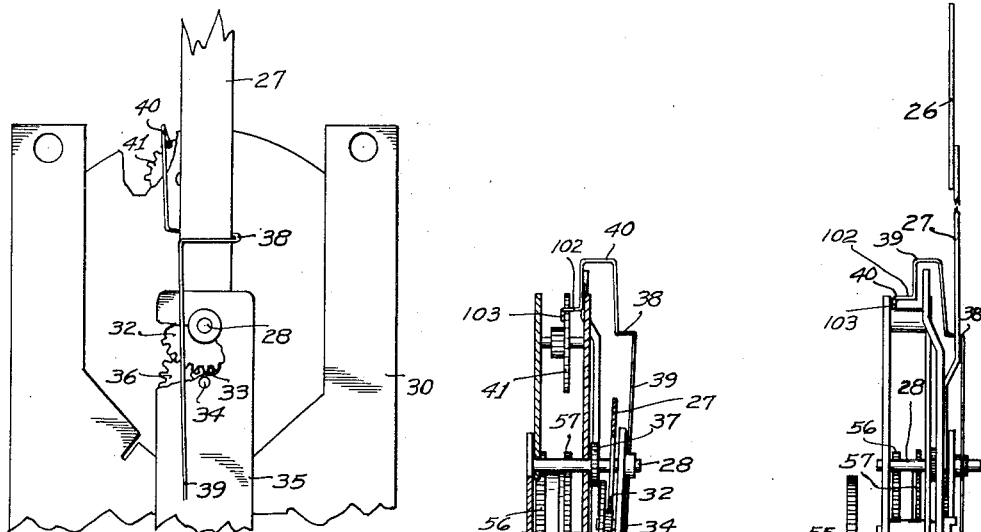
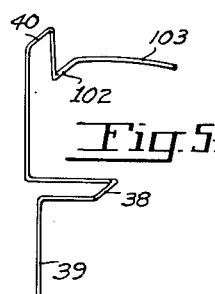
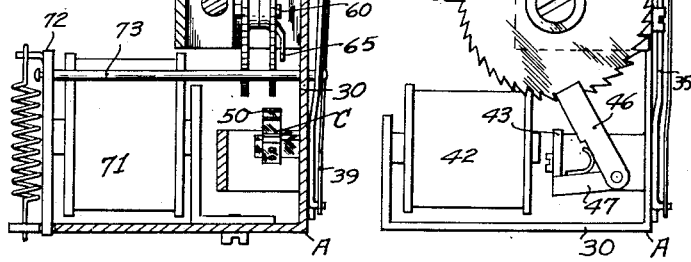
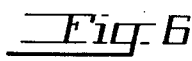
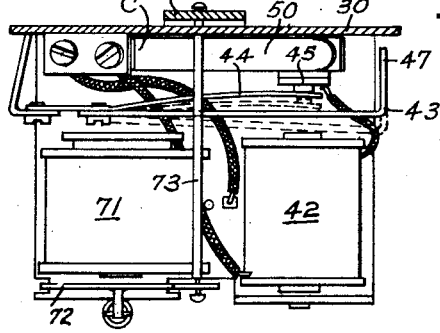
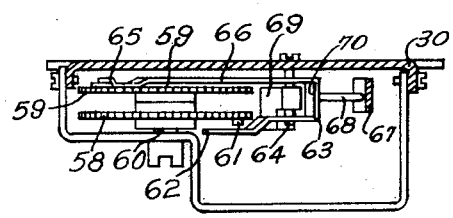
JAMES HICKEY
INVENTOR.
BY T. J. Geisler and
F. R. Geisler.
ATTORNEYS Nov. 27, 1945.  J. HICKEY  2,389,908
PARKING INDICATOR
Filed Jan. 20, 1942  3 Sheets-Sheet 3
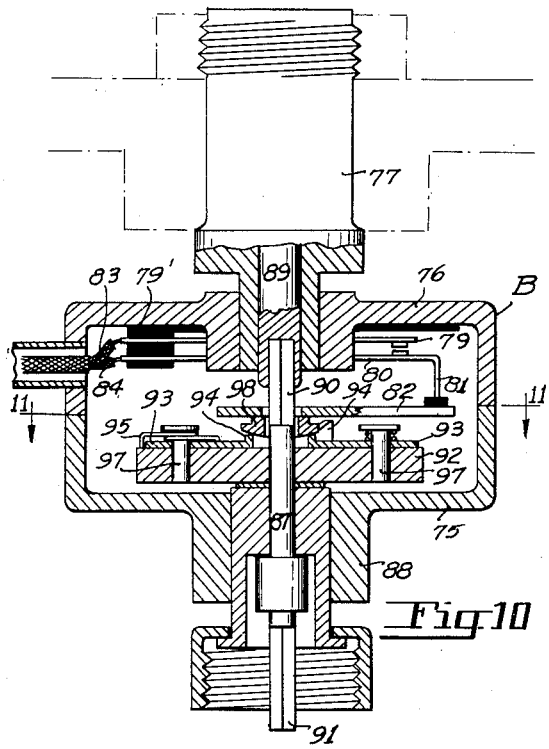
*Fig.10*
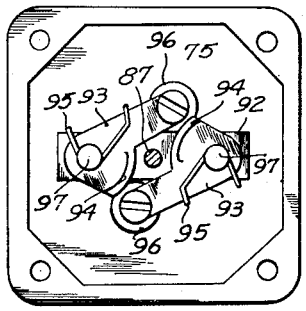
*Fig.11*
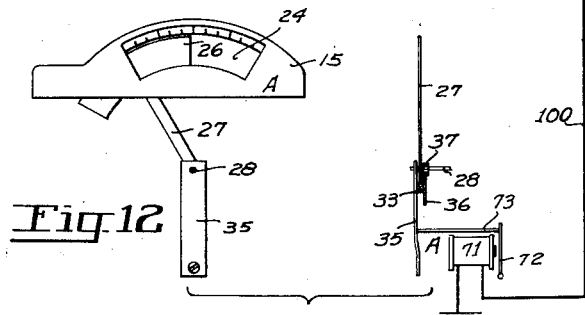
*Fig.12*
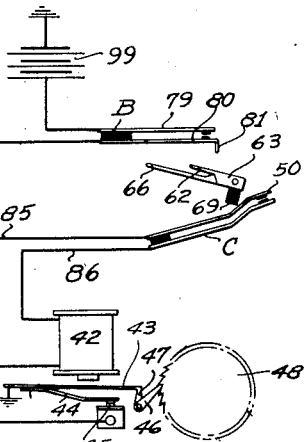
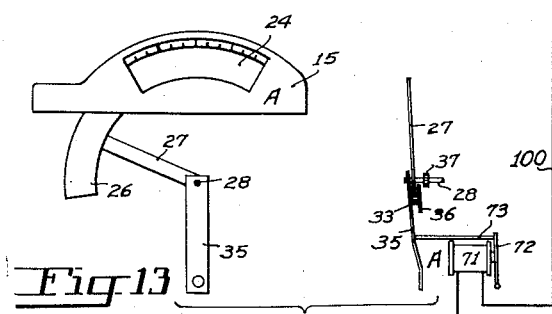
*Fig.13*
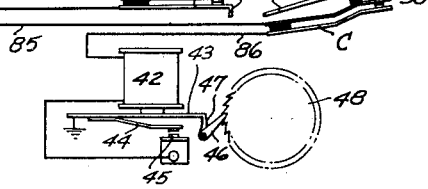
JAMES HICKEY
INVENTOR.
BY T. J. Geisler and
F. R. Geisler.
ATTORNEYS Patented Nov. 27, 1945

2,389,908

UNITED STATES PATENT OFFICE 2,389,908

PARKING INDICATOR

James Hickey, Portland, Oreg.

Application January 20, 1942, Serial No. 427,476

7 Claims. (Cl. 161—15)

This invention relates to a parking time indicator, adapted to be carried on a vehicle and visible from the outside of the vehicle, for the purpose of indicating the length of time the vehicle is parked in any one location without being moved.

More particularly, this invention relates to a parking meter of the type described in my application, Ser. No. 363,165, filed under date of October 28, 1940, now U. S. Patent No. 2,289,362, issued under date of July 4, 1942, and application Ser. No. 406,989, filed under date of August 15, 1941, now U. S. Patent No. 2,302,218, issued under date of November 17, 1942, both patents similarly being entitled "Parking indicator." Like the parking meters described in these patents, my present invention concerns a parking meter which is operated by a clockwork mechanism and is so arranged that the parking time indicator will be caused to function automatically whenever the vehicle is stopped and will be automatically reset whenever the vehicle is put in motion.

In a vehicle parking meter of the type indicated, in which the parking time indicator is automatically operated by a spring-driven clock mechanism, it is necessary to provide means for winding the clockwork mechanism, and such winding should be done automatically to insure the continuous functioning of the parking indicator.

An object of the present invention is to provide an improved means for winding such clockwork mechanism.

Another object of this invention is to provide simple associated means for controlling and limiting the winding of the clockwork mechanism in order that the clockwork spring will be wound only when necessary and will not be overwound.

These objects, as well as other objects and improvements, I attain by employing electrical devices and associated simple mechanism, and by making certain modifications in the parking meters described in my other pending applications above referred to, and by otherwise constructing my improved parking meter in the manner hereinafter described with reference to the accompanying drawings.

In the drawings:

Fig. 1 is a side elevation of the parking time indicator and its associated clockwork mechanism, with the side cover plate removed from the housing of the latter;

Fig. 2 is a side elevation of the clockwork mechanism drawn to a larger scale and taken from the side opposite to that shown in Fig. 1;

Fig. 3 is a similar side elevation of the clockwork mechanism but showing certain parts broken away for clarity;

Fig. 4 is a fragmentary side elevation of that portion of the clockwork mechanism which contains the clock winding switch and actuating elements, with the other parts of the mechanism removed;

Fig. 5 is a fragmentary side elevation of part of the clockwork mechanism taken from the same side as Fig. 1 and illustrating the manner of mounting the indicating arm;

Fig. 5A is a drawing, in perspective, of the upper portion of the spring member shown in Fig. 5;

Fig. 6 is an end elevation of the clockwork mechanism taken on the line 6—6 of Fig. 2;

Fig. 7 is a vertical section of the clockwork mechanism taken on line 7—7 of Fig. 2, but showing the position of certain elements when the indicator arm 27 has been lowered from the position in Fig. 5;

Fig. 8 is a sectional plan of the clockwork mechanism corresponding to line 8—8 of Fig. 2;

Fig. 9 is a partial sectional plan of the clockwork mechanism corresponding substantially to line 9—9 of Fig. 4;

Fig. 10 is a longitudinal sectional elevation of the governor switch used in conjunction with the clockwork mechanism;

Fig. 11 is a sectional plan of the governor, corresponding to line 11—11 of Fig. 10, but drawn to a smaller scale;

Fig. 12 is a schematic layout of the electrical circuits and associated elements of the device, illustrating the manner of functioning while the vehicle is at rest and while the parking time is being registered by the indicator; and Fig. 13 is a similar schematic layout illustrating the position or function of these elements when the vehicle is in motion and when the spring for the clockwork mechanism is being rewound.

The device illustrated, in which my present invention is embodied, includes a visible parking time indicating means secured preferably at the top of the hood of the automobile or other vehicle, for registering the length of time the vehicle has been parked. This indicating means is controlled and operated by a clockwork mechanism. The clockwork mechanism is provided with electric means for winding the actuating spring. The electric winding means is controlled partly by a governor which in turn is operated by the speedometer drive of the vehicle. Thus the electric means can wind the spring for the clockwork only when the vehicle is in motion. Associated means is provided for limiting the amount of the winding of the clockwork spring.

The device in general consists of two assemblies, namely the visible parking time indicating means, which is designated by the reference character A, and which includes the indicator on the outside of the vehicle hood, and the clockwork mechanism adjacent thereto and located inside the hood; and a governor assembly, designated in general by the reference character B, and mounted at any point for convenient connection with the speedometer drive.

Referring first to Fig. 1, a narrow ornamental hollow housing 15 containing the time indicator is secured on the top of the vehicle hood, or in any other suitable location on the outside of the vehicle, in any suitable manner. Each side of the housing 15 has an arcuate window 24, both windows being of the same size and being arranged in registration with each other. Time-indicating indicia 25 may be placed adjacent the upper arcuate edges of the windows.

Depending from the outer housing 15 is the housing 23 for the clockwork mechanism, which is located inside the vehicle hood. The base 16 of the housing 15 is rectangular in plan and is larger in perimeter than the clockwork housing 23, so that it extends over and covers the hole in the hood through which the clockwork housing extends.

An indicating segment 26, substantially the same size as the windows 24, is secured upon the upper end of an arm 27. The arm 27 is pivotally supported on the shaft 28 of the clockwork mechanism. Movement of the segment 26 in a clockwise direction (as viewed in Figure 1) progressively obstructs the view through the windows 24 and indicates the length of time the vehicle has been continuously parked.

The clockwork mechanism is of standard construction, such, for example, as that ordinarily used in inexpensive watches, and need not be described in detail. I shall refer only to parts which have been added to the clockwork mechanism or to portions to which other members of my device are directly connected.

The bottom end of the arm 27 is formed into a gear segment 32 (see Figs. 5 and 7) which meshes with a pinion 33. The pinion 33 is journaled on a stub shaft 34 supported on a throw-out bracket arm 35. A gear 36 is formed integral with the pinion 33 and is adapted to mesh with the driven pinion 37 rigidly mounted on the shaft 28 of the clockwork mechanism. Thus the operation of the clockwork mechanism imparts rotation to the pinion 37, and, when the gear 36 is in mesh with pinion 37, produces arcuate movement of the arm 27.

The throw-out bracket arm 35 is secured at the bottom to the lower portion of the frame 30 (Fig. 7) of the clockwork mechanism. The upper portion of this bracket arm, on which the stub shaft 34 is mounted, can be pushed outwardly away from the frame 30, and when it is pushed into outer position, the gear 36 will be thrown out of mesh with the driven pinion 37, as shown in Fig. 7, which in turn permits the arm 27 to be moved independently of the clockwork mechanism. The bracket arm 35 exerts a spring tension normally, however, to hold gear 36 in mesh with pinion 37. The means for pushing the bracket arm 35 outwardly against its spring tension includes a solenoid 71, a movable plate 72, and a rod 73 connecting the plate 72 and bracket arm 35. When the solenoid 71 is energized, the plate 72 will be pulled against the solenoid core, forcing the bracket arm 35 outwardly into the disengaging position shown in Fig. 7. The solenoid 71, in a manner to be explained later, is energized only when the vehicle is in motion. When the vehicle is not in motion the operation of the clockwork mechanism for producing rotation of the pinion 37, will cause the arm 27, and with it the indicating segment 26 (Fig. 1), to move gradually towards the right, as viewed in Fig. 1.

When the maximum time has been consumed, the arm 27 (see Figs. 1 and 5), will then be in the position shown in Fig. 5. A wire spring 39, the bottom end of which is attached to the bracket arm 35, has a U-shaped bend 38 which engages the arm 27. The upper or free end 40 of this wire spring 39 is bent as indicated at 102 in Fig. 5A, and this horizontal section 102 is adapted to engage the teeth of the escapement wheel 41 when the arm 27 has reached the predetermined limit of its movement indicated in Fig. 5. A tail portion 103 extends from the section 102 substantially at a right angle thereto and is located behind the escapement wheel 41 (see also Fig. 7). This tail portion is so formed and arranged that it will bear against the rear face of the escapement wheel 41 (as viewed in Fig. 5) when the bracket arm 35 is thrust outwardly, but will not engage the escapement wheel when the bracket arm 35 is in its normal position. When the arm 27 is in the raised position shown in Fig. 5 and the bracket arm 35 is thrust outwardly causing gear 36 to be disengaged from the pinion 37 (Fig. 7), the wire spring 39, urging the arm 27 in counter-clockwise direction, will cause the arm 27 to return to the starting position. It is only necessary to have the spring 39 start the movement of the arm 27 back to its original position, inasmuch as the weight of the segment 26 will then be sufficient to return segment and supporting arm to starting position. The spring 39 thus serves three purposes; first, to stop the running of a clockwork mechanism when the arm 27, and with it the indicating segment 26, have reached a predetermined position; second, to aid in returning the arm 27 and segment 26 to the starting position as soon as the gear 36 is disengaged from the pinion 37; and third to prevent the clockwork mechanism from running, even though the segment 26 and arm 27 have been returned to starting position, as long as the bracket arm 35 remains thrust outwardly, i. e., as long as the vehicle is in motion and solenoid 71 is energized.

The winding of the clockwork mechanism is accomplished in a special manner which constitutes an important feature of the present invention. For this purpose I employ an electric vibrator or buzzer assembly which is best shown in Fig. 8 and which comprises the conventional coil 42, vibrating arm 43, vibrating contact 44 and stationary contact 45. Electrical energy is supplied to the coil 42 from the vehicle battery through switches and controls to be described later.

A ratchet pawl 46 (Figs. 6 and 2), is pivoted on the angularly-formed end or ear 47 of the vibrator arm 43 (Fig. 8), and is adapted to engage a ratchet wheel 48. The ratchet wheel 48 is secured to the end of a worm shaft 49 (Fig. 3), journaled in suitable supports attached to the frame of the clockwork mechanism.

The worm 51 (Fig. 3) of the worm shaft 49 engages with a worm gear 52. The worm gear 52 is rigidly mounted on a shaft 53 on which a pinion 55 is also secured. Pinion 55 engages the spring-winding gear 56 of the clockwork mechanism.

From this brief description of the spring winding means it will be apparent that as long as electrical current continues to pass to the coil 42, winding of the clockwork spring will occur. The passage of electrical current from the vehicle battery to the coil 42 is subject to two controls, one of which is operated by a governor connected to the vehicle speedometer drive, to be described later, and the other of which is operated by means connected with the clockwork mechanism itself. The purpose of this latter control is to permit current to pass to coil 42 only when the clockwork spring needs winding and to stop the flow of current to coil 42 as soon as the spring has been sufficiently wound.

A spring-operated gear 57 (Fig. 7), of the clockwork mechanism, which is driven by the spring of the spring-winding gear 56 in the usual manner, is mounted concentrically with the spring-winding gear 56. These two gears 56 and 57 mesh with the gears 58 and 59 respectively which are journaled for independent rotation on the shaft 60. A trip pin 61 (Figs. 4 and 7) is carried on the gear 58. A hook 65 is carried on the gear 59. A U-shaped toggle lever 63, pivotally mounted on a pin 64, has its ends formed into a long arm 66 and a short arm 62 (Fig. 4). The trip pin 61 of the gear 58 is adapted to engage the short arm 62 of the toggle lever 63 when the gear 58 is rotated by the turning of the gear 56 during the winding of the spring, the rotation of gear 58 being counterclockwise as viewed in Figs. 3 and 4. The rotation of the gear 58 with the winding of the spring thus operates to raise the toggle lever 63 from the position shown in Fig. 4 to that shown in Fig. 3. When the clockwork spring has been wound a predetermined amount the toggle lever is therefore moved into the raised position of Fig. 3. On the other hand, the rotation of gear 59, which rotation is produced by the operation of the clockwork mechanism, will finally cause the long arm 66 of the toggle lever 63 to be engaged by the hook 65 on the gear 59, and this will move the toggle lever 63 from the position shown in Fig. 3 back to the position shown in Fig. 4.

An insulating block 69, located within the arms of the U-shaped toggle lever 63, is pivoted on the same pin 64 and is adapted to be engaged by the connecting and crossbar section 70 of the toggle lever 63 whenever the toggle lever is moved to either of the extreme positions shown in Fig. 3 or 4. The bottom free end of the pivoted insulating block 69, when moved to the position of Fig. 4, engages the end of a spring contact arm 50 of the switch C. A spring 67 (Fig. 4) carries a link pin 68, the outer end of which is seated in a socket in the connecting cross-bar section 70 of a toggle lever 63. The end of the pin 68 bears against the toggle lever with considerable spring pressure so as to act as a snapover spring whenever the toggle lever moves beyond the center of its path in either direction, urging the lever quickly to the end of its path in that direction. The toggle lever 63 and insulating block 69 are so arranged that there is sufficient lag in the actuation of the insulating block to cause the movement of the block to be delayed until after the toggle lever has passed the center of its movement and is snapped over by the spring 67. This arrangement is necessary because of the slow rotation of the gears, such slow movement not being practical directly for making and breaking an electrical circuit through breaker points.

In Fig. 3 the rewinding of the spring has been completed and the switch C has been opened and thus prevents further passage of current to the coil 42 for any further winding of the clockwork spring for the time being. In Fig. 4 the clockwork mechanism has been running sufficient time to cause the spring to require winding again and the switch C consequently closed in order to permit the rewinding means to function.

The governor B, illustrated in detail in Figs. 10 and 11, includes a housing, made in two halves 75 and 76, secured together in any suitable manner. A cylindrical adapter assembly 77, to which the upper half 76 of the governor housing is attached, extends through the side of the transmission case (shown in broken line in Fig. 10) and is secured therein. The construction and position of the adapter assembly 77 is the same as that of the conventional speedometer adapter, and the speedometer drive is connected therewith in the usual manner.

A pair of electrical contact arms 79 and 80 are mounted, spaced apart, in an insulating post 79' attached to the upper half 76 of the housing. These arms 79 and 80 carry contact points at their free ends which contacts are closed whenever the lower arm 80 is pushed upwardly closing the contact with the upper arm 79. The free end of the lower arm 80 is bent at a right angle to form a downwardly-extending leg 81 which bears against a slidable disc 82. Conducting wires 83 and 84 are connected to the arms 79 and 80, respectively.

A shaft 87 extends through the hub 88 of the lower half 75 of the housing and is engaged with the transmission-driven shaft 89 at its square end 90. The opposite end of the shaft 87 is also squared as at 91 to engage with the conventional speedometer cable.

A bar 92 is fixedly secured to the shaft 87 and rotates therewith. A pair of weighted arms 93 are pivotally secured adjacent the ends of the bar 92 and have cam surfaces 94 extending therefrom. These arms are shown more clearly in Fig. 11. Springs 95 retain the arms 93 normally in the position shown in Figs. 10 and 11. When the bar 92 is rotated at sufficient speed (for example, such speed as is produced when the vehicle moves at the rate of about fifteen miles per hour), the weights 96 at the ends of the arms cause the arms to swing outwardly on their pivot pins 97 against the force of the springs 95. This movement of the arms causes their cam surfaces 94 to push a washer member 98 and the disc 82 upwardly on the shaft 87 and the disc 82 in turn pushes the contact arm 80 upwardly until its contact point is brought ito contact with the corresponding contact point of the arm 79 and the circuit between the two contact arms closed. As soon as the vehicle stops moving the rotation of the shaft 87 ceases and the arms 93, washer member 98, disc 82, and contact arm 80, return to their normal positions shown in Fig. 10.

The operation of my device may now be explained briefly with reference to the schematic layouts constituting Figs. 12 and 13. In Fig. 12 it is assumed that the vehicle is at rest and the parking time is accordingly being indicated. Since the speedometer drive is not rotating, the circuit between the vehicle battery 99 and the solenoids 42 and 71 of my device is open, since the contact arms 79 and 80 are separated. The arm 27, and with it the indicating segment 26 is moved by the clockwork mechanism, in the manner previously explained, and the segment 26 gradually moves across the windows in the housing on top of the vehicle hood. Should the vehicle remain parked longer than the predetermined time (for example, longer than two hours), the operation of the clockwork mechanism will automatically be stopped at the expiration of such predetermined time, and will remain stopped until the vehicle is moved.

In Fig. 13 it is assumed that the vehicle is being moved and also that the clockwork spring now needs rewinding. With the movement of the vehicle the circuit through the governor is closed, since the contact points of the arms 79 and 80 will be brought into engagement by the governor, and current passes from the vehicle battery 99 to the solenoid 71 over the conductor 100. This causes the solenoid 71 to be energized which results in the upper end of the bracket arm 35 being thrust outwardly, in the manner previously described, and disconnecting the gears and lower end of the arm 27 from the driven pinion 37 of the clockwork mechanism. The moment this takes place the arm 27 and with it the indicating segment 26 return to their starting positions, but the clockwork mechanism, having previously been stopped by the parking of the vehicle for the full predetermined time, will remain idle and will be prevented from running again until the vehicle is again stopped and bracket arm 35, and with it wire spring 39, are returned to inward position. Since it is assumed that the clockwork spring has become sufficiently unwound, the toggle lever 63 will have been moved downwardly from the position of Fig. 12 to the position of Fig. 13, in the manner previously described, closing the contacts in the switch C. This will result in current passing over the conductors 85 and 86 to solenoid 42. The energizing of the solenoid 42, with the current passing through the contact point 45 connected therewith, will cause the arm 43 to vibrate and the ratchet pawl 46 to rotate the ratchet wheel 48 to wind the clockwork spring. This winding of the spring, assuming that the vehicle continues in motion, will continue until the toggle lever 63 is returned to the raised position, in the manner previously described, to open the switch C, which then prevents further rewinding until the spring again has become sufficiently unwound. As long as the vehicle is in motion the arm 27 and indicating segment 26 will remain disconnected from the clockwork mechanism, but the clockwork mechanism will also be prevented from running, as explained, thus preventing any unnecessary wear and prolonging the life of the clockwork mechanism. As soon as the vehicle stops the current to solenoid 71 is shut off by the governor B, the clockwork mechanism will start running, the arm 27 and segment 26 will again be operated by the clockwork mechanism, and the segment 26 will start to register the parking time. Thus the operation of my device, including the indicating of the parking time, the disconnecting of the time indicator by movement of the vehicle, the stopping of the clockwork mechanism, and the winding of the spring for the clockwork mechanism, all take place in an entirely automatic manner.

I claim:

1. In a vehicle parking indicator, including a movable indicating member, a clockwork mechanism, means connecting said clockwork mechanism with said indicating member, a solenoid adapted, when energized, to disconnect said connecting means and thereby disconnect said indicating member from said clockwork mechanism, an electrical circuit connected to said solenoid, means for opening and closing said circuit, spring means for stopping the running of said clockwork mechanism whenever said indicating member is disconnected from said clockwork mechanism, said spring means also acting to stop the running of said clockwork mechanism when said indicating member has been connected to said clockwork mechanism a predetermined length of time.

2. In a vehicle parking indicator of the character described, including a movable indicating member, a clockwork mechanism, gears connecting said clockwork mechanism with said indicating member, a spring member normally holding said gears in mesh, a solenoid adapted, when energized, to throw said gears out of mesh and thereby disconnect said indicating member from said clockwork mechanism, spring means for stopping the running of said clockwork mechanism whenever said indicating member is disconnected from said clockwork mechanism, said spring means also acting to stop the running of said clockwork mechanism when said indicating member has been connected to said clockwork mechanism a predetermined length of time, an electric circuit connected to said solenoid, a control in said electric circuit, a speedometer drive, said control operated by said speedometer drive.

3. In a vehicle parking indicator, including a movable indicating member, a clockwork mechanism, gears connecting said clockwork mechanism with said indicating member, a spring member normally holding said gears in mesh, a solenoid adapted, when energized, to throw said gears out of mesh and thereby disconnect said indicating member from said clockwork mechanism, means for stopping the running of said clockwork mechanism whenever said indicating member is disconnected from said clockwork mechanism, said latter-mentioned means also acting to stop the running of said clockwork mechanism when said indicating member has been connected to said clockwork mechanism a predetermined length of time, an electric circuit connected to said solenoid, a control in said electric circuit, a speedometer drive, said control operated by said speedometer drive, a spring for operating said clockwork mechanism, electrically-operated means for winding said spring, said electric circuit also connected to said latter mentioned electrically-operated means.

4. In a vehicle parking indicator, including a movable indicator, and a clockwork mechanism for moving said indicator, a spring for operating said clockwork mechanism, electrically-operated spring-winding means, a switch associated with said spring-winding means, a make and break in said switch connected with said spring and so arranged as to close said switch when said spring is unwound a predetermined amount and to open said switch whenever said spring is sufficiently wound, a source of electrical energy, an electrical connection between said source of electrical energy and said switch, a control in said connection, a speedometer drive, said control operated by said speedometer drive, said control so arranged as to permit electric current to pass to said switch only when the vehicle is in motion, whereby said winding will take place only when the vehicle is in motion and only to the extent required by the spring.

5. In a vehicle parking indicator, including a movable indicating member, a clockwork mechanism, gears connecting said clockwork mechanism with said indicating member, spring means normally holding said gears in mesh, electrically-operated means for throwing said gears out of mesh and thereby disconnecting said indicating member from said clockwork mechanism, a control in said electrically-operated means, a speedometer drive, said control being operated by said speedometer drive, a spring for operating said clockwork mechanism, electrically-operated spring-winding means, a switch associated with said spring-winding means, a make and break in said switch connected with said spring and so arranged as to close said switch when said spring is unwound a predetermined amount and to open said switch whenever said spring is sufficiently wound, said electrically-operated spring-winding means connected through said switch to said control, a vehicle battery, an electrical connection between said vehicle battery and said control.

6. In a vehicle, a movable parking indicator, a clockwork mechanism for moving said indicator, gears connecting said clockwork mechanism with said indicator, a member normally holding said gears in mesh, electrically-operated means for throwing said gears out of mesh and thereby disconnecting said indicator from said clockwork mechanism, means for stopping the running of said clockwork mechanism whenever said indicator is disconnected from said clockwork mechanism, a control in said electrically-operated means, a speedometer drive, said control operated by said speedometer drive, a spring for operating said clockwork mechanism, electrically-operated spring-winding means, a switch associated with said spring-winding means, a make and break in said switch connected with said spring and so arranged as to close said switch when said spring is unwound a predetermined amount and to open said switch whenever said spring is sufficiently wound, said electrically-operated spring-winding means connected through said switch to said control, a source of electrical energy, an electrical connection between said source of electrical energy and said control, said control so arranged as to permit electric current to pass to said switch only when the vehicle is in motion.

7. A vehicle parking indicator, including a movable indicating member mounted on the outside of the vehicle, a clockwork mechanism located on the inside of the vehicle, gears connecting said clockwork mechanism with said indicating member, spring means normally holding said gears in mesh, electrically-operated means for throwing said gears out of mesh and thereby disconnecting said indicating member from said clockwork mechanism, a spring for stopping the running of said clockwork mechanism whenever said indicating member is disconnected from said clockwork mechanism, said spring also acting to stop the running of said clockwork mechanism when said indicating member has been connected to said clockwork mechanism a predetermined length of time, a control in said electrically-operated means, a speedometer drive, said control operated by said speedometer drive, a spring for operating said clockwork mechanism, electrically-operated spring-winding means, said spring-winding means also connected to said control, a switch associated with said spring-winding means, a make and break in said switch connected with said spring and so arranged as to close said switch when said spring is unwound a predetermined amount and to open said switch whenever said spring is sufficiently wound, a vehicle battery, an electrical connection between said vehicle battery and said control, said control so arranged as to permit electric current to pass to said switch only when the vehicle is in motion, whereby said winding will take place only when the vehicle is in motion and only to the extent required by the spring, said electrically-operated spring-winding means including a ratchet wheel, a spring-winding gear connected with said ratchet wheel, an electric vibrator, a vibrating arm in said vibrator, a ratchet pawl associated with said vibrating arm and engaging said ratchet wheel, whereby the vibration of said arm will cause said ratchet wheel to be rotated and said winding gear to wind said spring.

JAMES HICKEY.